UNITED STATES PATENT OFFICE.

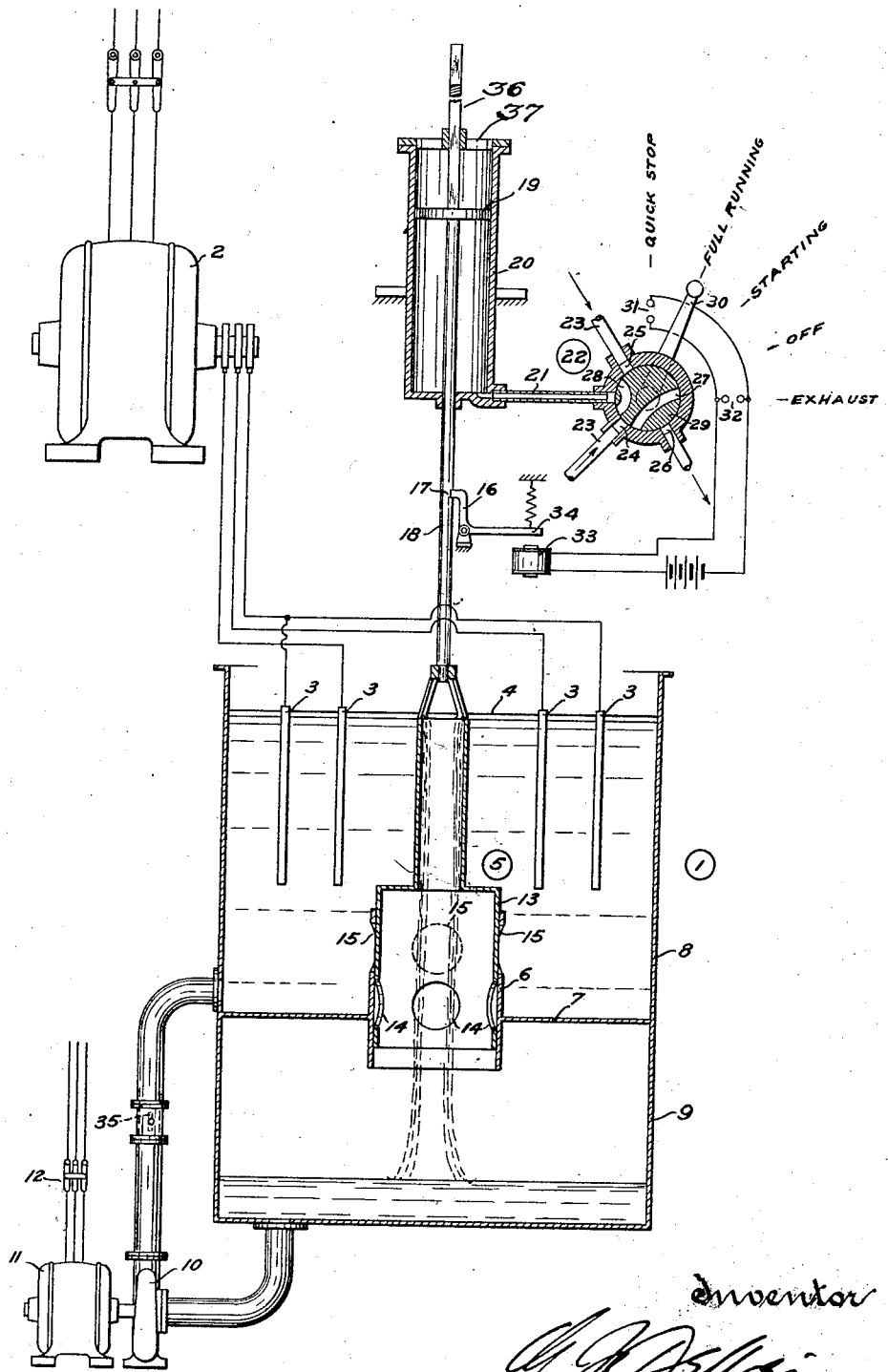

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

LIQUID RHEOSTAT.

1,332,167.  Specification of Letters Patent.  Patented Feb. 24, 1920.

Application filed November 6, 1918. Serial No. 261,428.

*To all whom it may concern:*

Be it known that I, GEORGE F. DE WEIN, a citizen of the United States, residing at Milwaukee, in the county of Milwaukee and State of Wisconsin, have invented a certain new and useful Improvement in Liquid Rheostats, of which the following is a specification.

This invention relates to rheostats and a method of operating the same, and more particularly the type known as liquid rheostats.

In motors controlled by liquid rheostats it frequently becomes desirable to quickly stop the motor. This may be accomplished to a certain degree, for example, by lowering the weir with which such rheostats are usually provided, whereby the liquid or electrolyte in the electrode-containing tank of the rheostat is permitted to run out through, or over the weir. Weirs of the tubular or of the wall type are usually of considerable length and therefore an appreciable time is taken to move the weir its entire length from full-running to stopping position. It is one of the objects of this invention to shorten this time.

Another object of the invention is to avoid the use of a separate and distinct mechanism for providing for a quick discharge of electrolyte from the rheostat.

Another object of the invention is to provide unitary means for determining the level of the electrolyte in the rheostat tank and for quickly discharging said electrolyte.

Another object of the invention is the provision of a method of operating a weir-type of rheostat whereby a rapid discharge of electrolyte may be secured.

Other objects will appear hereinafter as the description of the invention proceeds.

The novel features of the invention will appear from this specification and the accompanying drawing which forms a part thereof and discloses one embodiment of said invention, and all these novel features are intended to be particularly pointed out in the claims.

The single figure of the drawing discloses in diagrammatic form a liquid rheostat embodying the novel features of this invention.

The rheostat 1 is here shown as controlling a motor 2 having a secondary winding connected to the electrodes 3. These electrodes are shown in a conventional manner and may be supported in any suitable and well known way so as to be immersible in the electrolyte with which the rheostat tank may be filled. The rheostat is shown on the drawing as in full-running position, the liquid level 4 being indicated, whereby the electrodes 3 are substantially completely submerged. The liquid level is determined by means of the weir 5, here shown as of tubular form, and operatively related to a guide member 6 also here shown as tubular which latter may be mounted in any suitable manner in the partition 7, which divides the rheostat tank into an electrode-containing compartment 8 and a reservoir compartment 9.

A pump 10 is provided for pumping the liquid or electrolyte from the reservoir compartment into the electrode-containing compartment. The pump may be driven by a motor 11, controlled by the switch 12 in any desired manner.

The weir 5 is here shown as having an enlarged portion 13, but it may be stated that this is not necessary as far as the principles of this invention are concerned, as the weir may be made of uniform diameter or shape throughout. The enlarged portion 13 is provided with openings 14 of any desirable number. In the full-running position these openings 14 are out of registry with the openings 15 in the guide member 6. The weir 5 when raised to its full-running position, as shown in the drawing, is stopped in that position by the latch 16 which engages a notch 17 in the rod 18, which member serves to lift the weir. The weir may be lifted by any suitable form of motive means and in order to show one form of control mechanism with which the invention may be utilized the rod is here shown as operated by the piston 19 lifted by fluid pressure in the cylinder 20. Fluid is admitted below the piston through the inlet pipe 21. The admission and exhaust of fluid is controlled by controller 22 which is connected to air supply pipes 23. The controller has a quick-stop port 24 connected to the air supply and a starting-port 25 also connected to the air supply as clearly shown. The controller is also provided with an exhaust port 26 and with an exhaust passage 27, and an inlet passage 28, both disposed in a movable valve-member 29 to which the control lever 30 is operatively connected. The control lever has five different positions, namely, exhaust, off, starting, full-running, and quick-stop, which will be hereinafter more fully explained.

Contacts 31, 32 are provided to be bridged by the control lever 30 in its quick-stop and exhaust positions respectively. When these contacts are bridged, the magnet 33 is energized from any suitable source and operates to attract the armature member 34 operatively related to the latch 16.

The operation of the device is as follows:

Assuming that the parts are as shown in the drawing and that the control lever 30 is moved to the position indicated as Exhaust, the magnet 33 will be energized and the latch 16 will be withdrawn from the notch 17. The rod 18, and thus the weir, is then free to move and inasmuch as the exhaust passage 27 now connects the inlet pipe 21 and the exhaust port 26, the weir will move down by reason of gravity acting on the piston and weir, but springs or other means might obviously be provided for this purpose. If now the lever 30 is moved to the position marked Off, the contacts 32 will be freed and the magnet 33 will be deënergized; in this position none of the ports are connected by the passages in the controller. If the control lever 30 is moved to starting position the inlet passage 28 will connect the starting port 25 to the inlet pipe 21 and fluid will be admitted below the piston thereby raising the same until the latch engages the notch 17 when the weir will be stopped. The weir may of course be raised any desired intermediate amount. In order to obviate leakage of fluid the control lever may now be moved to the full running position, in which it is shown in the drawing, whereby fluid supply is cut off from the inlet pipe 21. The piston however remains in its raised position inasmuch as the latch 16 holds the rod 18. A square tail-rod 36, operating in a guide-spider 37, is provided for preventing turning of the rod 18 and associated parts.

With the weir in its full-running position electrolyte may now be caused to fill the electrode-containing compartment by being pumped from the reservoir compartment into said electrode-containing compartment at any suitable or desired rate which may be determined by the capacity of the pump or by the valve 35. The rate of supply of electrolyte may, if desired, be such that with the weir in full-running position there will be a continuous circulation of electrolyte, the excess passing over the top of the weir and down through the same into the reservoir compartment.

If it is now desired to quickly stop the motor, the control lever 30 is moved to the quick-stop position where the magnet 33 will be again energized thus releasing the latch 16 and at the same time causing the inlet passage 28 to connect the quick-stop port 24 to the inlet pipe 21. Fluid is thus admitted to the cylinder and raises the weir beyond its full-running position, an amount sufficient to cause registry between the openings 14, 15. This, as is plain, will permit of a quick discharge of the electrolyte from the electrode-containing compartment, thus stopping the motor. It is clear that the movement of the weir from its full-running position to the position in which quick discharge may be obtained may be made a small fraction of the distance which it travels from starting to full-running position. In this manner a much quicker action is secured than by lowering of the weir.

It is to be understood that where the term tubular is used to designate the configuration of an element, the cross-section of the element in question may be of any form and is not limited to a circular cross-section.

It should be understood that it is not desired to limit the invention to the exact details herein shown and described for obvious modifications within the scope of the appended claims may occur to persons skilled in the art.

It is claimed and desired to secure by Letters Patent:

1. In a liquid rheostat, an electrode-containing tank, a weir for determining the liquid level in said tank, said weir raising the liquid level when moved in a predetermined direction, and means for lowering the liquid level when said weir is moved further in the same direction.

2. In a liquid rheostat, an electrode containing tank, means for determining the liquid level in said tank, said means having a predetermined length of stroke between a stopping and running position and means for quickly lowering said liquid level by a lesser movement of said level determining means.

3. In a liquid rheostat, an electrode-containing tank having a discharge opening, and unitary movable means coöperating with said opening for determining the liquid level in said tank and for quickly discharging the liquid through said opening.

4. In a liquid rheostat, an electrode containing tank, a weir for determining the liquid level in said tank, means for raising said weir to its full running position, means for stopping the weir in said full running position and means for quickly lowering the liquid level when the weir is raised a further distance in the same direction.

5. In a liquid rheostat, a tank having a discharge opening including a tubular member, a tubular weir for coöperating with said tubular member, said weir having two limiting positions, one in which the electrodes are not submerged in liquid and another in which they are fully submerged, said tubular member and said weir having openings which do not come into registry until the tubular weir moves beyond said second limiting position.

6. In a liquid rheostat, a tank, means for separating said tank into an electrode-containing compartment and a reservoir compartment including a tubular member and a tubular weir adapted to slide within said tubular member, said tubular member and said tubular weir having openings out of registry when said weir is in full running position.

7. In a liquid rheostat, a tank comprising an upper compartment and a lower compartment, the upper compartment being adapted to receive electrodes and the lower compartment to serve as a reservoir, a tubular weir, a tubular member in which said weir is slidably disposed between the said compartments, transverse openings in said tubular member, and transverse openings in said tubular weir adapted to register with the transverse openings in said tubular member in a predetermined position, whereby the liquid may be discharged from said upper compartment to the lower compartment when said openings are in registry.

8. In a liquid rheostat, an electrode-containing tank and unitary means for determining the liquid level in said tank and for quickly discharging the liquid from said tank comprising means operable from one position to a second position to raise the liquid level to full running position and operable in the same direction to bring said liquid level to stopping position.

9. In a liquid rheostat, an electrode-containing tank, and means for determining the liquid level in said tank and for quickly discharging the liquid therefrom comprising a weir permitting a flow of liquid over the top but not past the bottom thereof while in normal full-running position and permitting a flow past the bottom thereof when moved beyond full-running position.

10. In a liquid rheostat, an electrode-containing tank, and unitary movable means for determining the liquid level in said tank and for quickly discharging the liquid therefrom comprising a weir permitting a flow of liquid over the top thereof and past the bottom thereof respectively.

11. In a liquid rheostat, an electrode-containing tank having a discharge opening, and unitary movable means including a weir coöperating with said opening for determining the liquid level in said tank and permitting a discharge of liquid at a predetermined rate through said weir and at a different rate through said opening.

12. In a liquid rheostat, an electrode-containing tank, an opening in said tank, a weir coöperating with said opening for determining the liquid level in said tank, said weir closing said opening to the passage of liquid throughout the major portion of the length of the weir and freeing said opening for the discharge of liquid through a minor portion of said length, while permitting a discharge of liquid over the top of said weir.

13. In a liquid rheostat, an electrode-containing tank having an opening in the bottom thereof, a tubular weir coöperating with said opening for determining the liquid level in said tank, said weir closing said opening to the passage of liquid throughout the major portion of the length of the weir and freeing said opening for the discharge of liquid through a minor portion of said length, while permitting a discharge of liquid over the top of said weir.

14. In a liquid rheostat, an electrode-containing tank and means for determining the liquid level in said tank and discharging liquid therefrom comprising a weir permitting rates of discharge of liquid disproportionate to the vertical position of the weir.

15. In a liquid rheostat, an electrode-containing tank and means for determining the liquid level in said tank and discharging liquid therefrom comprising means permitting of a discharge of liquid dependent on the height of liquid level in said tank in a plurality of positions of said second means and of an abrupt increase in rate of discharge in another predetermined position.

In testimony whereof, the signature of the inventor is affixed hereto.

G. F. DE WEIN.